March 30, 1926.

J. DAOUST 1,578,958

DEVICE FOR LOOKING UNDER WATER

Filed May 21, 1925

INVENTOR
Joseph Daoust
BY
Irving Harness
ATTORNEY

Patented Mar. 30, 1926.

1,578,958

UNITED STATES PATENT OFFICE.

JOSEPH DAOUST, OF DETROIT, MICHIGAN.

DEVICE FOR LOOKING UNDER WATER.

Application filed May 21, 1925. Serial No. 31,772.

*To all whom it may concern:*

Be it known that I, JOSEPH DAOUST, a citizen of the United States, residing in the city of Detroit, county of Wayne, and State of Michigan, have invented certain new and useful Improvements in a Device for Looking Under Water, of which the following is a specification, reference being had to the accompanying drawings.

It is the primary object of my invention to provide a periscopic device whereby one can plainly see under water at various depths and in a number of different directions.

It is a further object of my invention to provide an under-water reflector that is protected from foreign matter and water pressure by a glass casement and also guard wires.

Another object of my invention is to provide my device with electric lights so that the under-water elements can be plainly seen from a point above the water.

With the above and other objects in view, my invention consists in the arrangement, combination and construction of the various parts of my improved device as described in the specification, claimed in my claims and shown in the accompanying drawings, in which:

Figure 1:
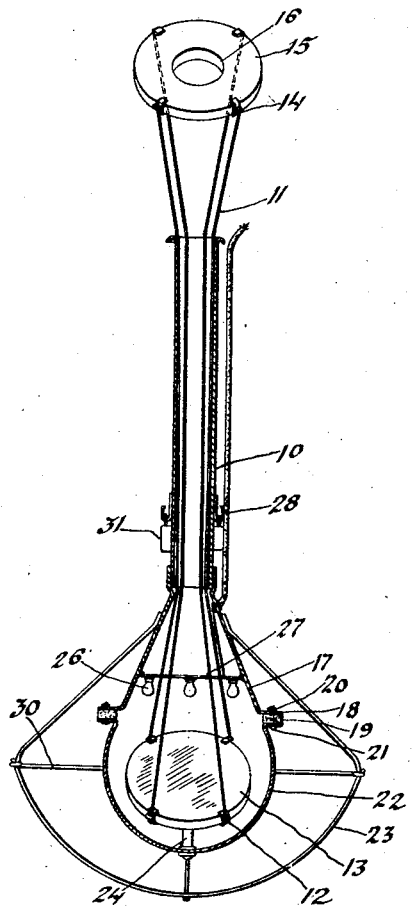
Fig. 1 is a front elevation of my improved device, shown partly in section.
Figure 2:
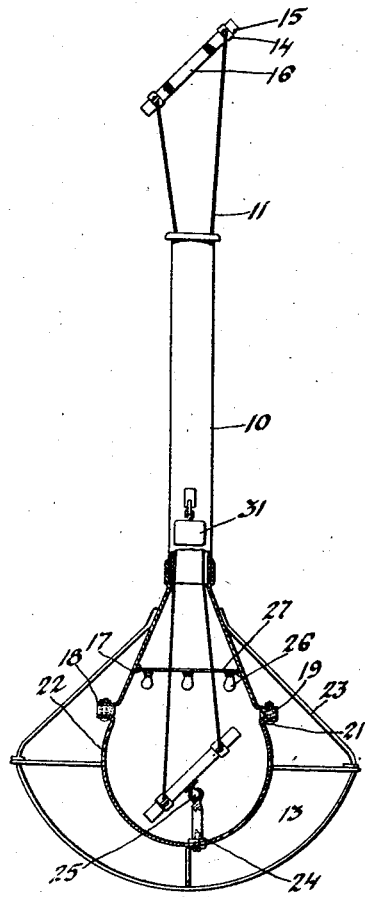
Fig. 2 is a side view of the same shown partly in section.

I have shown a pipe 10 into which are placed the wires 11 that have their ends extending out from both ends of the said pipe 10. Fastened to one end of the wires 11, by means of the clips 12 is the mirror 13, and secured to the other end of the wires 11, by means of the clips 14, is the disk 15 that has the centrally located aperture 16.

A metal casing 17 having the flanged end 18 is secured to the end of the pipe 10. Fastened to the flange 18, by means of a rubber washer 19 and the bolts 21 and nuts 20, is the glass globe 22. Heavy guard strips 23, having the cross strip 30, are placed around the globe 22 and secured to the casing 17. A socket 24 is secured to the bottom of the globe 22 and a ball pin 25 that is fastened to the center of the mirror 13 is placed in said socket so that the mirror is pivoted by a ball and socket joint; thus allowing it to be moved at different angles. Electric lights 26 are placed above and around the mirror 13, by securing a hanger 27 to the inside of the casing 17. The electric circuit for these lights is supplied by the conduit 28. Weights 31 are placed around the pipe 11 to aid in lowering the device and to offset movement by the current.

In the practical use of my improved device, the mirror may be placed under water at various depths by means of the pipe 10, and then the lights 13 turned on. To focus the mirror at the angle or direction desired, the disk 15 is moved, which in turn moves the mirror that is pivoted on the ball and socket joint through the aid of the wires 14 in the same direction or at the same angle as the disk. Thus, by looking through the aperture 16 one can perceive the reflections of the mirror 13. For great depths magnifying lenses, properly adjustable, may be used, either connected directly with the aperture 16 or as a separate element.

The strips 23, 24, the casing 17 and the glass globe 22 prevent foreign matter from collecting around the mirror.

It is obvious that various changes may be made in the arrangement, combination and construction of the various parts of my improved device without departing from the spirit of my invention and it is my intention to cover by my claims such changes as may be reasonably included within the scope thereof.

What I claim is:

1. In a device of the class described comprising a pipe, an encasement secured to one end of said pipe, wires extending through and projecting from both ends of the pipe, a mirror, means for pivoting said mirror in the bottom of said encasement, a disk secured to one end of said wires and said mirror secured to the other ends thereof so that movement of the disk will cause a similar movement of the mirror and guard wires placed around said encasement.

2. In a device of the class described comprising a pipe, a glass globe, means for securing said globe to said pipe, a mirror, a ball and socket joint pivoting said mirror in the bottom of the globe, a disk, means connecting said disk and said mirror whereby movement of the disk will cause a similar movement of the mirror, lights positioned above, and around said mirror, guard wires protecting said glass globe and a centrally located aperture in said disk so that objects reflected in said mirror can be seen through said aperture,

JOSEPH DAOUST.